US008646219B2

(12) United States Patent
Lyness (10) Patent No.: US 8,646,219 B2
(45) Date of Patent: Feb. 11, 2014

(54) FIXTURE FOR LOCATING WIND TURBINE EQUIPMENT ON FOUNDATION PRIOR TO TOWER INSTALLATION

(75) Inventor: Thomas E. Lyness, Greer, SC (US)

(73) Assignee: General Electric Company, Schenectady, NY (US)

( * ) Notice: Subject to any disclaimer, the term of this patent is extended or adjusted under 35 U.S.C. 154(b) by 1216 days.

(21) Appl. No.: 12/130,042

(22) Filed: May 30, 2008

(65) Prior Publication Data

US 2009/0293372 A1   Dec. 3, 2009

(51) Int. Cl.
 *E04H 12/00* (2006.01)
(52) U.S. Cl.
 USPC ............. 52/40; 52/745.17; 248/544; 248/674
(58) Field of Classification Search
 USPC ........... 52/274, 293, 295, 297, 298, 684, 111, 52/113, 114, 40, 745.02, 745.03, 745.04, 52/745.05, 745.09, 745.15, 745.17, 52/745.18; 248/544, 674; 409/229; 405/229
See application file for complete search history.

(56) References Cited

U.S. PATENT DOCUMENTS

| 7,360,340 B2 | 4/2008 | Grundman et al. |
| 7,365,446 B2 | 4/2008 | Wobben |
| 2005/0072067 A1* | 4/2005 | Wobben ......................... 52/155 |

FOREIGN PATENT DOCUMENTS

| WO | 0111150 A1 | 2/2001 |
| WO | 2006056196 A1 | 6/2006 |

* cited by examiner

*Primary Examiner* — Joshua J Michener
*Assistant Examiner* — Theodore Adamos
(74) *Attorney, Agent, or Firm* — Ernest G. Cusick; Frank A. Landgraff (57) ABSTRACT

A fixture is provided for locating wind turbine equipment on a foundation within an inner envelope for a wind turbine tower, prior to erecting the wind turbine tower. The fixture includes a mounting section, adapted to mate with guide-points at predesignated locations on the wind turbine foundation; and a locating section, extending inward from the mounting section, adapted to locate the position for wind turbine equipment on the foundation for the wind turbine tower and within the inner envelope of the wind turbine tower.

20 Claims, 6 Drawing Sheets

FIXTURE FOR LOCATING WIND TURBINE EQUIPMENT ON FOUNDATION PRIOR TO TOWER INSTALLATION

BACKGROUND OF THE INVENTION

The invention relates generally to wind turbine equipment and more specifically to a fixture and method for locating wind turbine equipment on a foundation for a wind turbine tower, prior to the tower installation.

Early construction of wind power plants first produced a foundation, then the tower of the wind power plant was erected and subsequently a machine house was outfitted at the tip of the tower and the rotor was affixed with the rotor blades. After this, the electric power modules such as a transformer, switch cabinets, converters, a medium voltage system, a low voltage system, etc., were installed, often in a separate housing in proximity to the wind turbine tower.

Subsequently, wind plant equipment and methods were developed to construct a foundation and then place the essential power modules, such as transformer; switch cabinets; converters, medium voltage systems, and low voltage distribution on the wind turbine tower foundation, in various arrangements. Under these methods, the wind turbine tower (tower) was erected on the foundation over the electric equipment to provide protection from the elements and make use of otherwise vacant enclosed space within the tower. The electrical equipment may be prefabricated and consolidated in structures and modules, designed for mounting to the tower foundation. However, the locations for these structures and modules needs to be manually measured out and identified, such as by spray painting the foundation, prior to the positioning and mounting of the electrical equipment and subsequent erection of the tower. In the event of faulty location and mounting of these components, it was sometimes necessary to relocate in order to avoid interference with the tower base.

Accordingly, there is a need to provide a fixture and method for rapidly and accurately locating structures and equipment on the tower foundation prior to the installation of the tower.

BRIEF DESCRIPTION OF THE INVENTION

The present invention relates to a fixture and method for quickly and accurately locating and marking the position for mounting wind turbine equipment on the tower foundation within the envelope of the tower.

Briefly in accordance with one aspect of the present invention, a fixture is provided, adapted for locating wind turbine equipment on a foundation within an inner envelope for a wind turbine tower prior to erecting the wind turbine tower. The fixture includes a mounting section, adapted to mate with guidepoints at predesignated locations on the wind turbine foundation; and a locating section, extending inward from the mounting section, adapted to locate wind turbine equipment on the foundation for the wind turbine tower and within the inner envelope of the wind turbine tower.

In accordance with a second aspect of the present invention, a method is provided for locating wind turbine equipment on a foundation for a wind turbine tower, prior to the erection of the wind turbine tower. The method includes providing a guidepoint on a footprint on the foundation of the wind turbine; mounting a fixture to a first predesignated guidepoint; and marking a locator spot for the wind turbine equipment according to an orienting section of the fixture.

BRIEF DESCRIPTION OF THE DRAWING

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

The following embodiments of the present invention have many advantages, including quickly and accurately identifying the location for structures and wind turbine equipment that must be mounted on the wind turbine tower foundation within the envelope of the tower.

Many wind turbine towers include cylindrical tower sections that are attached axially together using connections such as bolted joint flanges at their ends. The base tower section may include bottom flanges that establish a tower footprint, of generally cylindrical shape, on the foundation. Alternatively, the bottom end of the base tower section may be bolted radially to a vertical element of inverted T-shaped connection members, or other such element.

However, prior to erection of the tower, structures and wind turbine equipment must be mounted on the foundation of the tower and internal to the base section of the tower. The mounted structures and wind turbine equipment must also be placed so as to avoid any inner elements for the base section of the tower. These inner elements of the tower may include the inverted T-shaped connection members supporting the base. The inner elements may also include any inward protrusions from the base section of the tower that may interfere with the placement of wind turbine equipment of the foundation of the tower.

The present invention provides the capability to accurately and quickly locate the placement of such structures and wind turbine equipment at predetermined locations within the envelope of the tower. The present invention eliminates the need for use of detailed drawings in order to establish reference distances and physical relationships for locating the base of the wind turbine equipment. Further, the present invention provides a simple procedure capable of being quickly learned by many different construction crews at disparate locations throughout the world who are responsible for constructing the wind turbines.

The present invention incorporates a fixture mounted to an accurately known position (guidepoint) on the foundation and extending to a precise location for the placement of the structure or wind turbine component. The guidepoint may include anchor bolts for the tower, where the anchor bolts extend from the anchor cage in the tower foundation.

In alternative tower arrangements, when the lowest part of the tower structure is embedded in the foundation, a horizontal flange may be provided, at the top of such an embedded part and above the upper surface of the foundation. The horizontal flange may be used for mating horizontal flange with a corresponding lower flange horizontal flange from the upper section of the tower. The boltholes on the top horizontal flange of the embedded tower part, within the foundation, may serve as guidepoints for the inventive fixture. It should be recognized that other guidepoints may also be established for mounting of the inventive fixture.

One embodiment of the inventive fixture may include a mounting section, a locating section and an orienting section. The fixture mounting section may include a plate adapted to sit flat relative to the foundation when mounted for locating components. The plate may include holes adapted to receive the guidepoints, such as the anchor bolts of the tower foundation. The holes in the plate may be alternatively aligned with the bolt holes on the top flange of the embedded tower part, within the foundation. In this case, the mounting section may be bolted to the upper horizontal flange for the embedded tower part.

The locating section may be fixed to the mounting section and extend in a generally inward direction to the establish a locating point for a corner or other fixed position on the component to be mounted on the foundation of the tower and within the envelope of the tower.

At the end of the mounting section, an orienting section may be attached. The orienting section may include an element shaped to assist in positioning a structure or wind turbine equipment on the foundation. Such an element may include a right angle normal to the axial direction of the tower. The right angle may define a corner position for the structure or the wind turbine equipment component. However the orienting section may be sized and shaped to accommodate the positioning of different structures and wind turbine equipment, of varying size, shape and configuration.

The elements being positioned by the fixture may include the corners for an enclosed structure within the tower. The structure may be used to house wind turbine equipment or mount a platform or frame to carry wind turbine equipment. Such a structured may also be preassembled with wind turbine equipment allowing for quick installation of the preassembled components. However, the elements being positioned need not be preassembled on the structure. The elements being positioned may also include individual wind turbine equipment components. Whether preassembled on a structure or mounted individually, such components may be electric components. The wind turbine equipment may be mounted on the structure, platform or frame, or be individually mounted to the foundation. The electric components may include, but not be limited to: transformers, switch cabinets, converters, medium voltage systems, and low voltage distribution systems, etc.

Figure 1:
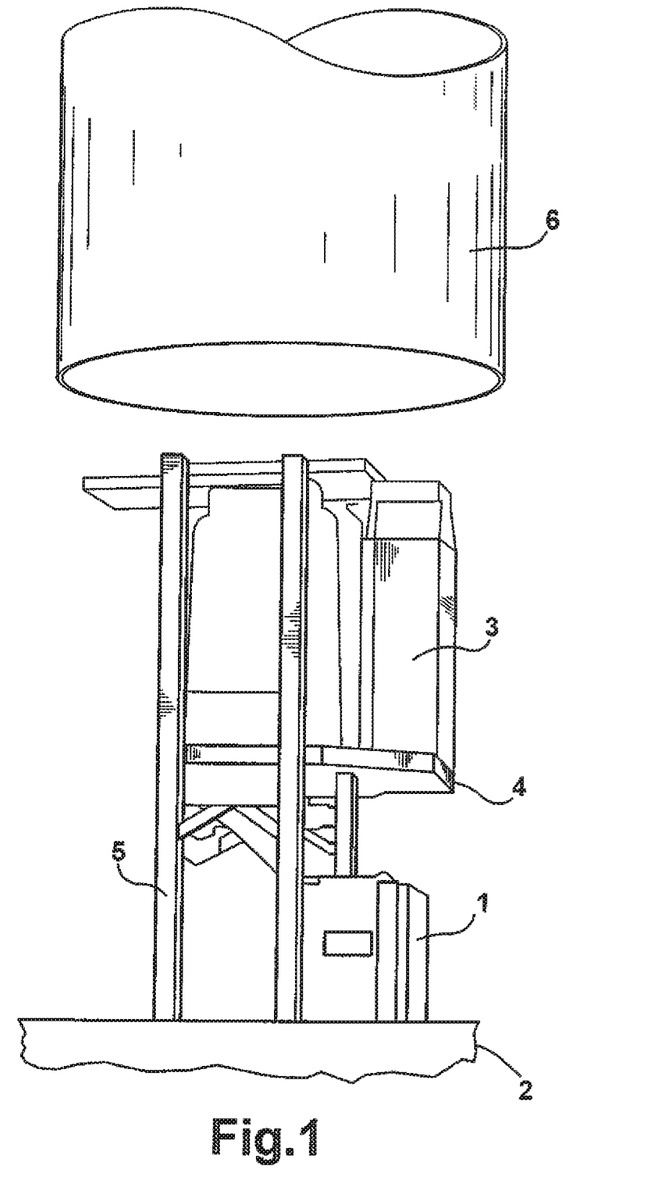
FIG. 1 illustrates a preassembled structure with electric components and an individual electric component mounted to the foundation of a wind turbine tower.

FIG. 1 illustrates a preassembled structure with electric components and an individual electric component mounted to the foundation of a wind turbine tower prior to the installation of the tower. Individual electric component 1 may be mounted on the foundation 2. Preassembled electric power components 3 may be mounted to an assembly 4 supported on footings or stanchions 5 attached to the foundation 1. When installation of the components has been performed, the tower 6 may be erected over the foundation and installed components.

The electric components may also include stub tubes for electric wiring to various electric components to be mounted on the structure, tower foundation and other locations within the tower. The electrical equipment on it may be connected to the cables coming into the tower from the outside. These cables can enter the tower conduits embedded in the foundation. Some of these cables are large and fairly rigid, malting it important to place the equipment as designed or risk being unable to make the electric connection. Therefore, the stub up tubes need to be precisely located relative to the equipment they will feed on the structure or tower floor.

The fixture may further include a reversible symmetry, such that the fixture may be flipped 180 degrees and translated to mount at other predesignated guidepoints on the tower footprint to locate at least one additional corner of the structure or the wind turbine equipment.

Figure 2:
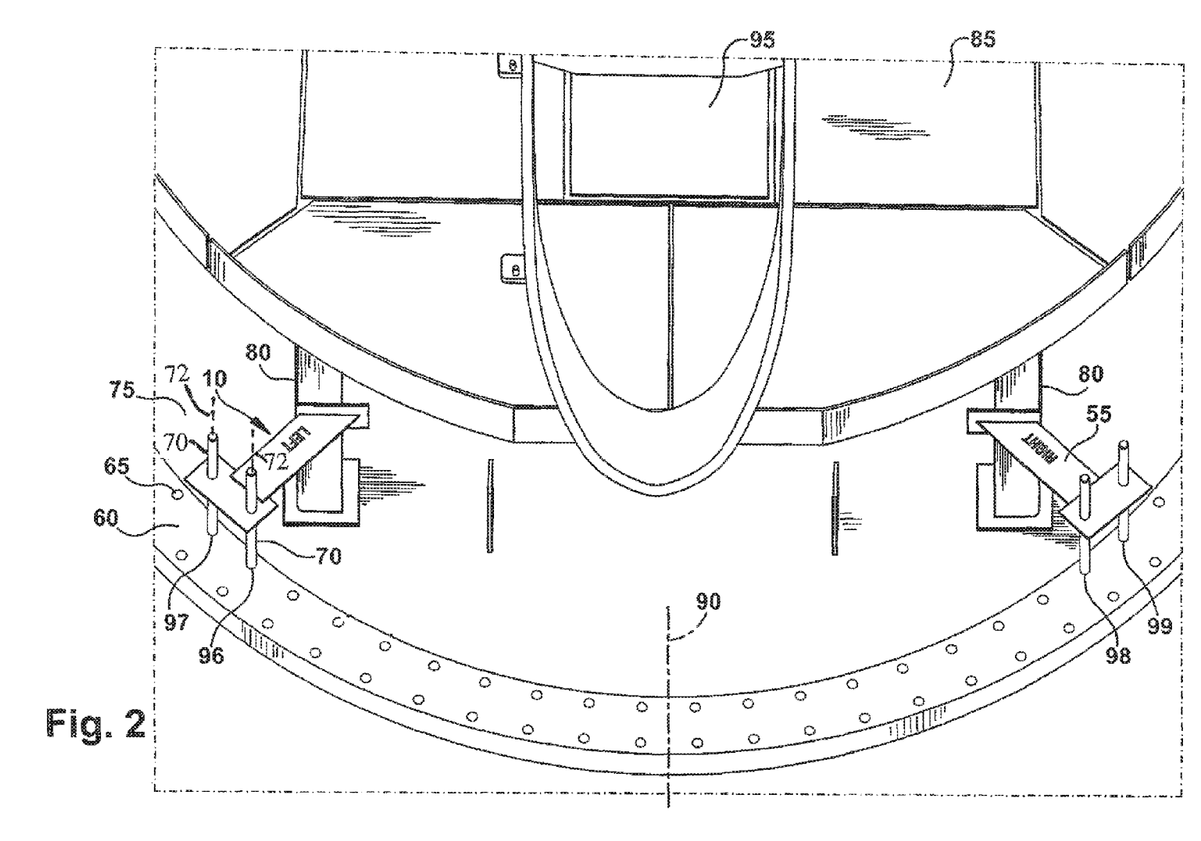
FIG. 2 illustrates one embodiment of an inventive fixture for locating a structure housing wind turbine equipment on the foundation of a wind turbine tower.

FIG. 2 illustrates one embodiment of a fixture for locating a structure housing wind turbine equipment on the foundation of a wind turbine tower. Anchor bolts 70 in the footprint of the anchor cage 60 for the tower provide guidepoints 72 for the mounting of the fixture 10. The anchor bolts 70 projecting upward from the anchor cage 60 are precisely located around the footprint for tower shell. The anchor cage holes 65 are indexed with respect to the centerline 90 of the door for the structure 85. Consequently, the anchor bolts may used as guidepoints 72 for positioning the fixture 10. The fixture may be indexed to a first predetermined location by designating the specific holes with reference to the centerline 90 to which the fixture is to be mounted. The length and shape of the fixture 10 with respect to the guidepoints 72 determine the placement of the footings 80 for the structure 85 on the foundation 75 for the tower. Fixture 10 is illustrated indexed to the left side of the centerline 90. Further, the fixture 10 may be reversed by rotating 180 degrees such that an underside facing the foundation 75 faces away from the foundation and translating to an indexed position on the right side of centerline 90 as shown for reversed fixture 55. Reversed fixture 55 may locate a second footing 80 for the structure 85. By precisely locating two footings for the structure, the structure may be properly and precisely positioned within the envelope of the tower, thereby avoiding interferences and the potential need for repositioning. While it is not shown, if individual wind turbine equipment components were to be mounted on the tower foundation, one or more of these components may be located by using one or more appropriately configured fixtures.

Figure 3A:
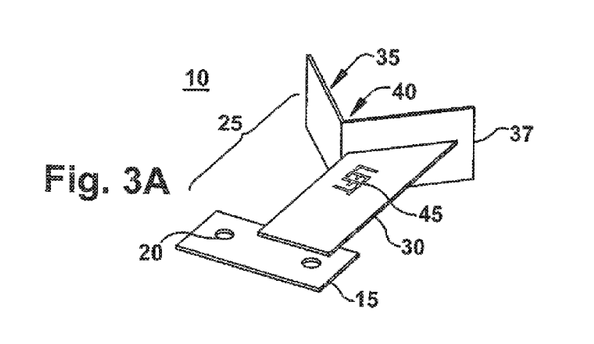
FIG. 3A illustrates an isometric view of one embodiment of a fixture adapted for locating wind turbine equipment on a foundation for the wind turbine tower.
Figure 3B:
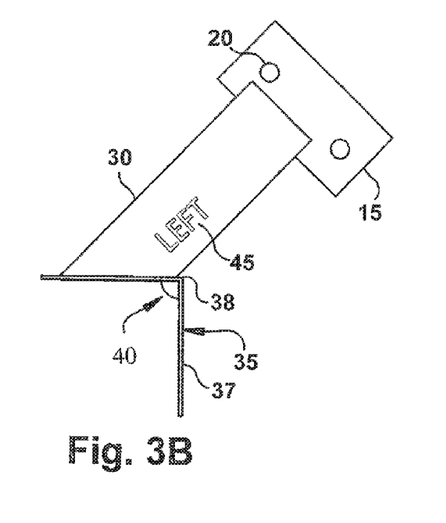
FIG. 3B illustrates a top view of one embodiment for a fixture adapted for locating wind turbine equipment on a foundation for the wind turbine tower.
Figure 3C:
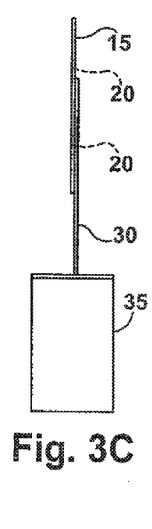
FIG. 3C illustrates a side view for one embodiment of a fixture adapted for locating wind turbine equipment on a foundation for the wind turbine tower.
Figure 3D:
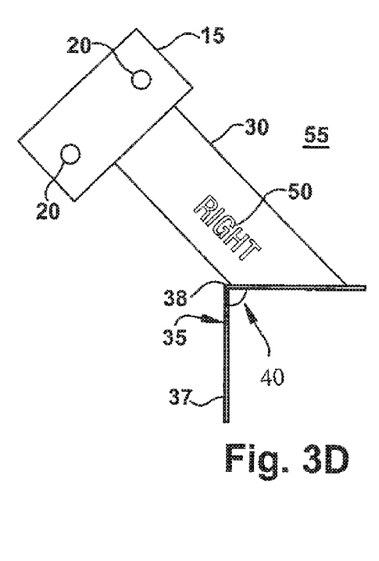
FIG. 3D illustrates a bottom view for one embodiment of a fixture adapted for locating wind turbine equipment on a foundation for the wind turbine tower.

FIG. 3A illustrates an isometric view of one embodiment of a fixture adapted for locating wind turbine equipment on a foundation for the wind turbine tower. FIG. 3B illustrates a top view of one embodiment for a fixture adapted for locating wind turbine equipment on a foundation for the wind turbine tower. FIG. 3C illustrates a side view for one embodiment of a fixture adapted for locating wind turbine equipment on a foundation for the wind turbine tower. FIG. 3D illustrates a bottom view for one embodiment of a fixture adapted for locating wind turbine equipment on a foundation for the wind turbine tower. The fixture 10 includes a mounting section 15 and a locating section 25. Mounting section 10 and locating section 25 may be fabricated from thin flat metal plate, which must be strong enough to support its own weight when suspended from a mounting location. The mounting section 15 may include a plurality of mounting holes 20, positioned normal to the face of the mounting section 15 and of appropriate diameter and location, to mate with guidepoints (previously described) on the foundation for the tower.

The locating section 25 extends from and may be attached to the mounting section 15 by welds or other means known in the art. The locating section 25 includes a guide arm 30 of appropriate length and orientation with respect to the mounting section 15 to place the end of the guide arm 30 opposite the mounting section 15 in proximity to the location for the structure or wind turbine equipment to be mounted to the foundation. The guide arm 30 may also include, at the end opposite the mounting section 15, an orienting section 35, adapted to fix the position of a corner of the structure or wind turbine equipment component being located on the foundation. In the embodiment shown, the orienting section 35 may be fixed to the guide arm by welding or other appropriate method known in the art. The orientating section 35 may include a plate 37 forming a 90-degree angle 40, with vertex 38. The plate 37 may define the position for the corner of the structure or wind turbine equipment component mounted on the foundation. The vertex 38 for the 90-degree angle is usually arranged in a parallel configuration with the axis of the tower. In other embodiments the orienting section may be formed in other shapes or sizes to define the position for other objects being located on the foundation. Further the top surface and the bottom surface of the guide arm 30 may be marked "LEFT" 45 and "RIGHT" 50 to facilitate orientation. In this case, "LEFT" 45 and "RIGHT" 50 identify which surface should be facing an individual mounting the fixture on the left side and the right side, respectively, of the centerline for the door of the structure.

Figure 4A:
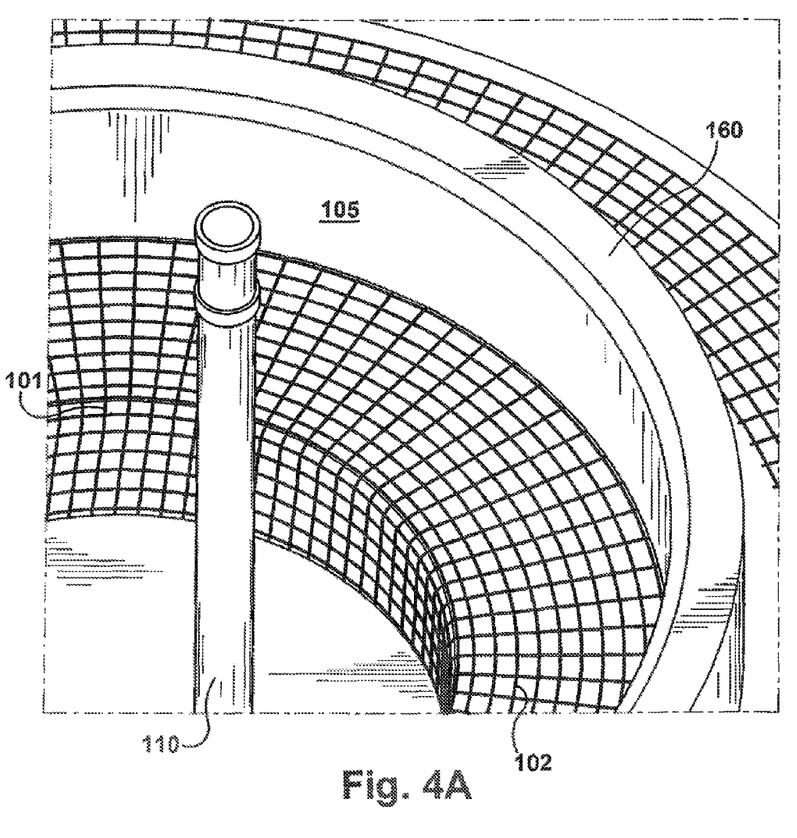
FIG. 4A illustrates a top view of an empty prearranged foundation (without concrete fill) with a steel reinforcement within an anchor cage.

FIG. 4A illustrates a top view of an empty prearranged foundation 105 (without concrete fill) with a steel reinforcement 102, 102 within an anchor cage 160. A stub up tube 110 (conduit) is waiting to be positioned prior to the concrete fill.

Figure 4B:
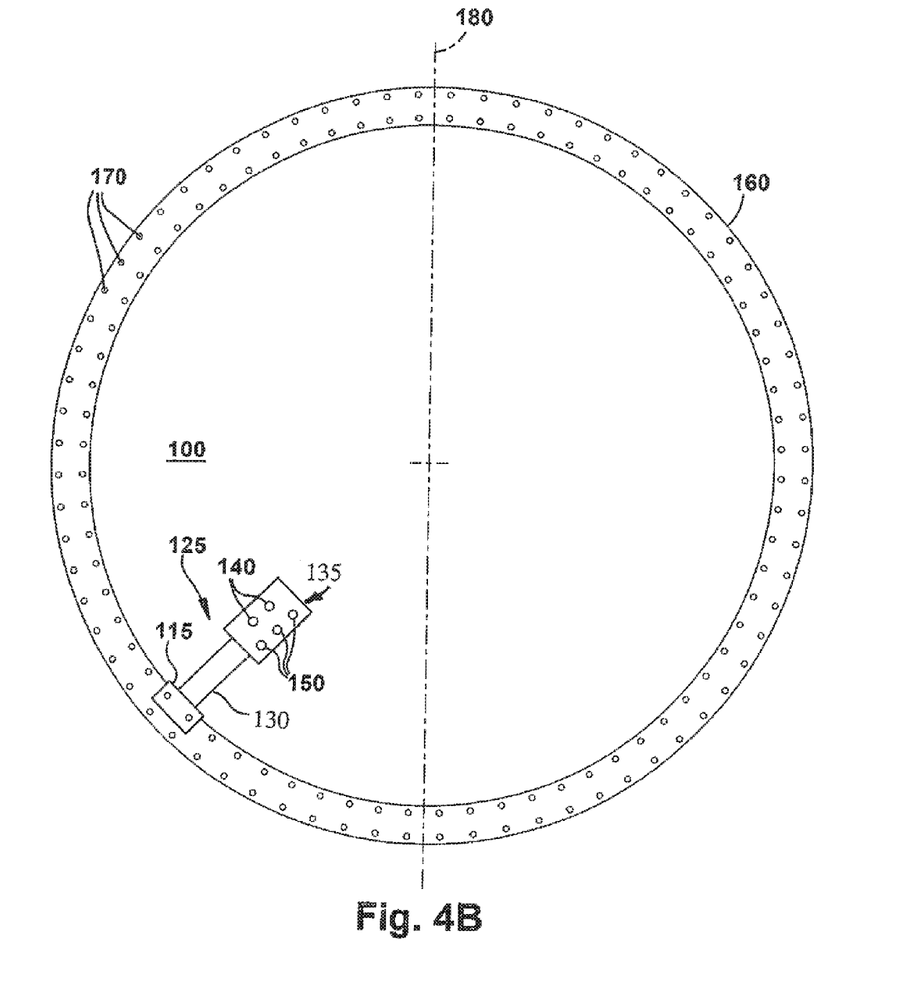
FIG. 4B illustrates another embodiment of an inventive fixture 100 for locating the placement of stub up tubes or conduits.

FIG. 4B illustrates another embodiment of an inventive fixture 100 for locating the placement of stub up tubes or conduits. The stub up tube 110 (FIG. 4A) provides a path for electric cables through the foundation to a location in proximity to where the power from the electric cables must be supplied. The stub up tube 110 needs to be accurately positioned in proximity to the electric components being supplied. After the stub up tubes 110 are positioned, concrete will be poured for the foundation section 105 within the tower footprint. Here, the fixture 100 is shown mounted to a guidepost set by anchor bolts 170 of the anchor cage 160. The fixture 100 comprises a mounting section 115 and a locating section 125, which includes a guide arm 130 and an orienting section 135. Dimensions and material strength for the fixture 100 may be determined by methods known to the art. The length and orientation of the guide arm 130 may be chosen to place the orienting section 135 in the general area of the stub up tubes 110 (extending vertically from the foundation). The orienting section 135 may be formed as a flat plate with cutouts of precise diameter and location to position the stub up tubes 110. The orienting section 135 may provide for a single stub up tube or multiple tubes. The tubes may be of the same or multiple diameters. Large diameter tube holes 140 and small diameter tube holes 150 are shown. More than one fixture may be employed if the tubes are required to be widely separated on the foundation.

A method is also provided for locating wind turbine equipment on a foundation for a wind turbine tower prior to erecting the wind turbine tower. The method may include providing a guidepoint on a footprint on the foundation of the wind turbine tower. The method provides for mounting a fixture to a first predesignated guidepoint. The fixture is of such size and orientation that an orientation section of the fixture will define a locator spot for the wind turbine equipment or structure. The step may further include indexing the mounting section of the fixture to a location relative to a designated predetermined location on the foundation, such as the centerline for the door of a structure being positioned. The method further includes marking a locator spot for the wind turbine equipment or structure according to the orienting section of the fixture.

The step of providing the guidepoint may further include providing anchor bolts for the foundation of the tower or providing boltholes on a top flange of an embedded tower part, within the foundation, to act as the guidepoints.

The step of marking locating spots for a plurality of components on the foundation may also include marking spots for a plurality of different components according to a plurality of associated fixtures, which may be of different size and orientation and be mounted at different guidepoint locations according to the required positioning for the components. The step of marking may also include marking the locating spot for a structure. These structures may include enclosed spaces such as a machinery or equipment room, or frames for components. The marking step may also include marking the spot for an electric component of the wind turbine equipment. The electric equipment may include, but not be limited to, transformers; switch cabinets; converters, medium voltage systems, low voltage distribution systems, etc. The electric component may also include a stub up tube for electric wiring for electric components within the tower. The method may include marking the locating spot for a stub tube for electric cabling for wind turbine equipment.

Further, the method for locating wind turbine equipment may also include the step of flipping the fixture 180 degrees and translating the fixture to a second predesignated guidepoint. The second predesignated point may also be indexed to the designated position for the centerline of the door for the structure being positioned. For example, the procedure may index the mounting section of the fixture to a first predesignated point (e.g., $9^{th}$ hole 96 and $10^{th}$ hole 97 on the anchor cage to the left of the centerline in FIG. 2). The method may further include mounting the fixture to the second predesignated guidepoint (e.g. $9^{th}$ hole 98 and $10^{th}$ hole 99 on the anchor cage to the right FIG. 2) of the centerline. The method may also include marking the locating spot according to the orienting section of the fixture.

Figure 5:
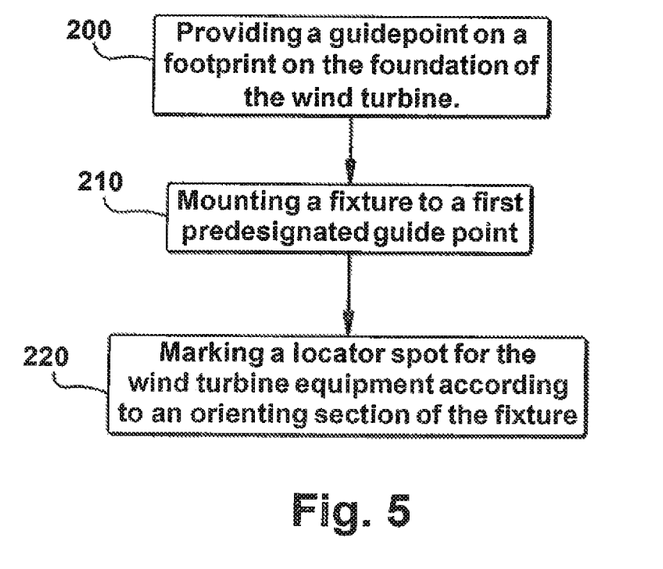
FIG. 5 illustrates a flowchart of an embodiment of a method for locating wind turbine equipment on a foundation for a wind turbine tower prior to erecting the wind turbine tower.

FIG. 5 illustrates a flowchart of a method for locating wind turbine equipment on a foundation for a wind turbine tower prior to erecting the wind turbine tower. Step 200 includes providing a guidepoint on a footprint on the foundation of the wind turbine. Step 210 includes mounting a fixture to a first predesignated guidepoint. Step 220 includes marking a locator spot for the wind turbine equipment according to an orienting section of the fixture.

While various embodiments are described herein, it will be appreciated from the specification that various combinations of elements, variations or improvements therein may be made, and are within the scope of the invention.

The invention claimed is:

1. A fixture adapted for locating wind turbine equipment on a foundation within an inner envelope for a wind turbine tower prior to erecting the wind turbine tower, comprising:
   guidepoints within a foundation of a wind turbine tower;
   a mounting section, adapted to mate with guidepoints at predesignated locations on a wind turbine foundation; and a locating section, extending inward from the mounting section, adapted to locate wind turbine equipment on the foundation for the wind turbine tower and within the inner envelope of the wind turbine tower.

2. The fixture adapted for locating wind turbine equipment on a foundation for a wind turbine tower according to claim 1, wherein the guidepoints on the foundation comprise: embedded guidepoints within the foundation.

3. The fixture adapted for locating wind turbine equipment on a foundation for a wind turbine tower according to claim 2, wherein the embedded guidepoints on the foundation comprise: anchor cage bolts for the foundation.

4. The fixture adapted for locating wind turbine equipment on a foundation for a wind turbine tower according to claim 2, wherein the embedded guidepoints on the foundation comprise: bolt holes on a top flange of an embedded tower part, within the foundation.

5. The fixture adapted for locating wind turbine equipment on a foundation for a wind turbine tower according to claim 2, wherein the locating section fixes a location for a corner of a structure.

6. The fixture adapted for locating wind turbine equipment on a foundation for a wind turbine tower according to claim 5, wherein the locating section fixes the location for a corner of a preassembled structure.

7. The fixture adapted for locating wind turbine equipment on a foundation for a wind turbine tower according to claim 2, wherein the locating section fixes a location for a wind turbine equipment component.

8. The fixture adapted for locating wind turbine equipment on a foundation for a wind turbine tower according to claim 7, wherein the locating section fixes the location for a wind turbine equipment electric component.

9. The fixture adapted for locating wind turbine equipment on a foundation for a wind turbine tower according to claim 8, wherein the wind turbine electric component comprises a stub up tube for an electric wiring.

10. The fixture adapted for locating wind turbine equipment on a foundation for a wind turbine tower according to claim 2, wherein the locating section comprises:
    a guide arm extending inward from the fixing section to an intended position of at least one of the structure and the wind turbine equipment; and
    an orienting section at an inner end of the guide arm adapted to orient at least one of the structure and the wind turbine equipment.

11. The fixture adapted for locating wind turbine equipment on a foundation for a wind turbine tower according to claim 2, further comprising:
    a reversible symmetry such that the fixture may be rotated 180 degrees so that an underside of the fixture facing the foundation may face away from the foundation, and be translated to mount at predesignated locations on a tower footprint for positioning an additional corner of the at least one of the structure and the wind turbine equipment.

12. The fixture adapted for locating wind turbine equipment on a foundation for a wind turbine tower according to claim 2, wherein the fixture is indexed to mount at predesignated locations on the guidepoints.

13. A method for locating wind turbine equipment on a foundation for a wind turbine tower prior to erecting the wind turbine tower, comprising:
    providing a guidepoint on a footprint on the foundation of the wind turbine;
    mounting a fixture to a first predesignated guidepoint; and
    marking a locator spot for the wind turbine equipment according to an orienting section of the fixture.

14. The method for locating wind turbine equipment according to claim 13, wherein providing the guidepoint comprises: providing anchor bolts for the foundation of the tower.

15. The method for locating wind turbine equipment according to claim 13, wherein providing the guidepoint comprises: providing bolt holes on a top flange of an embedded tower part, within the foundation.

16. The method for locating wind turbine equipment according to claim 13, further comprising: marking locator spots for a plurality of components on the foundation according to a plurality of associated fixtures.

17. The method for locating wind turbine equipment according to claim 13, further comprising: marking the locator spot for a structure.

18. The method for locating wind turbine equipment according to claim 13, further comprising: marking the locator spot for an electric component of the wind turbine equipment.

19. The method for locating wind turbine equipment according to claim 13, further comprising: marking the locator spot for a stub up tube for electric cabling for wind turbine equipment.

20. The method for locating wind turbine equipment according to claim 13, further comprising:
    rotating the fixture 180 degrees so an underside of the fixture facing the foundation may face away from the foundation;
    translating the fixture to a second predesignated guidepoint;
    mounting the fixture to the second predesignated guidepoint; and
    marking the locator spot according to the orienting section of the fixture.

* * * * *